United States Patent
Shigeno et al.

[19]

[11] Patent Number: 6,118,507

[45] Date of Patent: Sep. 12, 2000

[54] REFLECTION TN-ECB HAVING PARTICULAR RELATIONSHIPS BETWEEN PERPENDICULAR AXIS AND ORIENTED DIRECTIONS

[75] Inventors: Nobuyuki Shigeno, Kanagawa; Osamu Ishige, Tokyo, both of Japan

[73] Assignee: Sony Corporation, Tokyo, Japan

[21] Appl. No.: 09/291,015

[22] Filed: Apr. 14, 1999

[30] Foreign Application Priority Data

Apr. 20, 1998 [JP] Japan .................................. 10-125284

[51] Int. Cl.$^7$ ...................... G02F 1/1335; G02F 1/1347; G02F 1/1337
[52] U.S. Cl. .............................. 349/113; 349/75; 349/78; 349/130
[58] Field of Search ............................... 349/113, 75, 76, 349/78, 130

[56] References Cited

U.S. PATENT DOCUMENTS

| | | | |
|---|---|---|---|
| 5,325,218 | 6/1994 | Willet et al. | 349/98 |
| 5,361,151 | 11/1994 | Sonehara et al. | 349/76 |
| 5,731,858 | 3/1998 | Hisatake et al. | 349/113 |
| 5,990,991 | 11/1999 | Tillin et al. | 349/78 |

*Primary Examiner*—William L. Sikes
*Assistant Examiner*—Toan Ton
*Attorney, Agent, or Firm*—Hill & Simpson

[57] ABSTRACT

The orientation of a reflection type liquid crystal display device is improved to widen the field angle. A panel is provided with a transparent first substrate located on the external light incident side, a second substrate located on the opposite side bonded to the first substrate with interposition of a predetermined space, a twist-oriented nematic liquid crystal layer supported in the space between both substrates, and electrodes for applying a voltage to the nematic liquid crystal layer formed on both substrates. The nematic liquid crystal layer remains in twist orientation and functions as a quarter wavelength layer to allow the external light to pass in cooperation with the deflection plate and the quarter wavelength plate for displaying white while no voltage is applied. On the other hands the nematic liquid crystal layer is converted to perpendicular orientation and loses the function of a quarter wavelength layer not to allow the external light to pass for displaying black. The orientation direction 3U of nematic liquid crystal molecules which are in contact with the first substrate is prescribed in a range of 168.5±10 degrees with respect to the upward direction of the screen of the panel, and the orientation direction 3L of nematic liquid crystal molecules which are in contact with the second substrate is prescribed in a range of 51.5±10 degrees.

20 Claims, 5 Drawing Sheets

REFLECTION TN-ECB HAVING PARTICULAR RELATIONSHIPS BETWEEN PERPENDICULAR AXIS AND ORIENTED DIRECTIONS

BACKGROUND OF THE INVENTION

1. Field of the Invention

This invention relates to a reflecting liquid crystal display device for displaying with utilizing the external light such as natural light, and more particularly relates to a technology for improving the field angle of a reflection type liquid crystal display device.

2. Description of Related Art

A liquid crystal display device which utilizes liquid crystal as electro-optic material is featured in a flat-panel shape, light weight and thin configuration, and utilizes low power consumption. The liquid crystal display device has been developed very actively for use as a display of various potable apparatus. The liquid crystal is not emissive but forms an image by the mixture of patterned transmission and cutting off of the external light. Such passive liquid crystal display device is classified into transmission type and reflection type. A transmission type liquid crystal display device comprises a panel on which liquid crystal is held disposed between a pair of transparent substrates and a back light disposed on the back side of the panel, and an image is viewed from the front of the panel. A back light is essential for a transmission type liquid crystal display device, for example, a cold-cathode tube is used as the back light. A back light consumes the most of power supplied to the whole display, and is not suitable for the display of a portable apparatus. On the other hand, a reflection type liquid crystal display has a reflection plate on the back side of a panel, an external light such as natural light enters and an image of the reflected light is viewed from the front. Because a back light is not used differently from the transmission type, a reflection type display consumes relatively low power and is suitable as the display for portable apparatus.

In a liquid crystal display device, liquid crystal is birefringent, which is oriented controllably depending on various operation modes suitably. Due to this mechanism, a liquid crystal display device is field angle dependent, and is disadvantageous in that the contrast changes depending on the field angle of an viewer for viewing the screen. As shown in FIG. 5, the field angle of a viewer is represented by a declination (magnetic declination) $\phi$ and inclination (polar angle) $\theta$. In FIG. 5, the declination $\phi$ is represented by angular deviation in the anti-clockwise direction with respect to the orientation direction of liquid crystal of the panel. The inclination $\theta$ is represented by inclination with respect to the normal line of the panel 0. Heretofore, a so-called twist nematic (TN) mode liquid crystal panel has been used for reflection type liquid crystal display devices. FIG. 6 shows a field angle characteristics of a reflection type TN mode liquid crystal panel. FIG. 6 is an iso-contrast curve formed by plotting points where the contrast is equal each other on a graph having the declination $\phi$ in the circumferential direction and the inclination $\theta$ in the radial direction. As shown in this graph, a reflection type TN mode liquid crystal display is remarkably field angle dependent, and in this example, the display is designed so that the contrast is maximized at $\phi=180$ degrees from which a viewer views the screen. In a reflection type TN mode liquid crystal panel, the high contrast region appears in the rising direction of liquid crystal molecules by applying a voltage in the average molecule major axis direction of liquid crystal molecules and the low contrast region appears in the reverse direction. Usually, a panel is designed so that the high contrast region is faced to a viewer. This design method is effective only when the reflection plate is perfectly diffusive. In detail, the above-mentioned design is effective for the case in which the reflection plate is relatively diffusive and incident light comes widely from various direction for being viewed by a viewer. On the other hand, in the case that a reflection plate is not perfectly diffusive and directional, the incident light entered from the direction which is symmetrical to the viewer direction to the panel is viewed by a viewer mainly because a significant gain is added to the reflection characteristics, the design shown in FIG. 6 is not effective. As described herein above, it is necessary to give full consideration to the optical characteristics of a reflection plate in addition to the optical characteristics of a liquid crystal panel itself in designing the field angle of a reflection type panel.

The display screen of a reflection type TN mode liquid crystal display is dark and not convenient for use because two deflecting plates are incorporated. The TN-ECB mode display, which utilizes one deflecting plate, is promising as an reflection type liquid crystal display device in view of the display contrast. The TN-ECB mode is a system which utilizes retardation of liquid crystal basically, but the principle of TN mode is taken into the design from the view point of panel design. The reflection type TN-ECB mode is also field angle dependent, however, the field angle characteristics is different from the above-mentioned TN mode. In some cases, the reflection plate incorporated ina refection type TN-ECB mode panel is different from that incorporated in a usual TN mode panel. Heretofore, no research and development has been conducted to optimize the field angle of the reflection type TN-ECB mode liquid crystal display device, and the problem has remained unsolved.

SUMMARY OF THE INVENTION

To solve the above-mentioned conventional technical problem, the following measures are applied. A reflection type liquid crystal display device in accordance with the present invention is provided with a panel, a deflection plate, and a quarter wavelength plate as basic component. The panel is provided with a transparent first substrate located on the external light incident side, a second substrate located on the opposite side bonded to the first substrate with interposition of a predetermined space, a twist-oriented nematic liquid crystal supported in said space, and electrodes for applying a voltage to said nematic liquid crystal formed on the first and second substrates. The deflection plate and the quarter wavelength plate are provided on the first substrate. While no voltage is applied, the nematic liquid crystal remains in twist orientation and functions as a quarter wavelength layer to allow the external light to pass cooperatively with the deflection plate and the quarter wavelength plate for displaying white. On the other hand, while a voltage is applied, the nematic liquid crystal is converted to approximately perpendicular orientation and loses the function of a quarter wavelength layer not to allow the external light to pass cooperatively with the deflection plate and the quarter wavelength plate for displaying black. The reflection type liquid crystal display device is featured in that the orientation direction of the nematic liquid crystal which is in contact with the first substrate is prescribed in a range of 168.5±10 degrees with respect to the upward direction (perpendicularly upward direction on the screen) of the panel, and the orientation direction of the nematic liquid crystal which is in contact with the second substrate is prescribed in a range of 51.5+10 degrees with respect to the upward direction of the panel.

Preferably, a light reflection layer which reflects diffusively the external light in a limited angular range with respect to the regular reflection direction is formed on the second substrate. Further preferably, the transmission axis of the deflection plate is prescribed in a range of 125±10 degrees with respect to the upward direction of the panel.

In the reflection type liquid crystal display device in accordance with the present invention, the nematic liquid crystal remains in twist orientation to function as a quarter wavelength layer while no voltage is applied, and on the other hand, the nematic liquid crystal is converted to the perpendicular orientation to lose the function of a quarter wavelength layer when a voltage is applied. In other words, the reflection type liquid crystal display device in accordance with the present invention employs TN-ECB mode. The reflection type liquid crystal display device allows the external light to pass it cooperatively with the deflection plate and the quarter wavelength plate for displaying white while no voltage is applied, and cuts off the external light for displaying black while a voltage is applied. In other words, this device employs normally white mode. In such structure, by prescribing the orientation processing direction of nematic liquid crystal to about 168.5 degrees on the incident first substrate side and to about 51.5 degrees on the opposite side with respect to the upward direction of the screen, an ideal normally white mode TN-ECB reflection type liquid crystal display device having a wide field angle in the horizontal direction of the screen is realized.

Other objects and advantages of the invention will become apparent upon reading the following detailed description and appended claims, and upon reference to the accompanying drawings.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

DETAILED DESCRIPTION OF THE PREFERRED EMBODIMENTS

Figure 1:
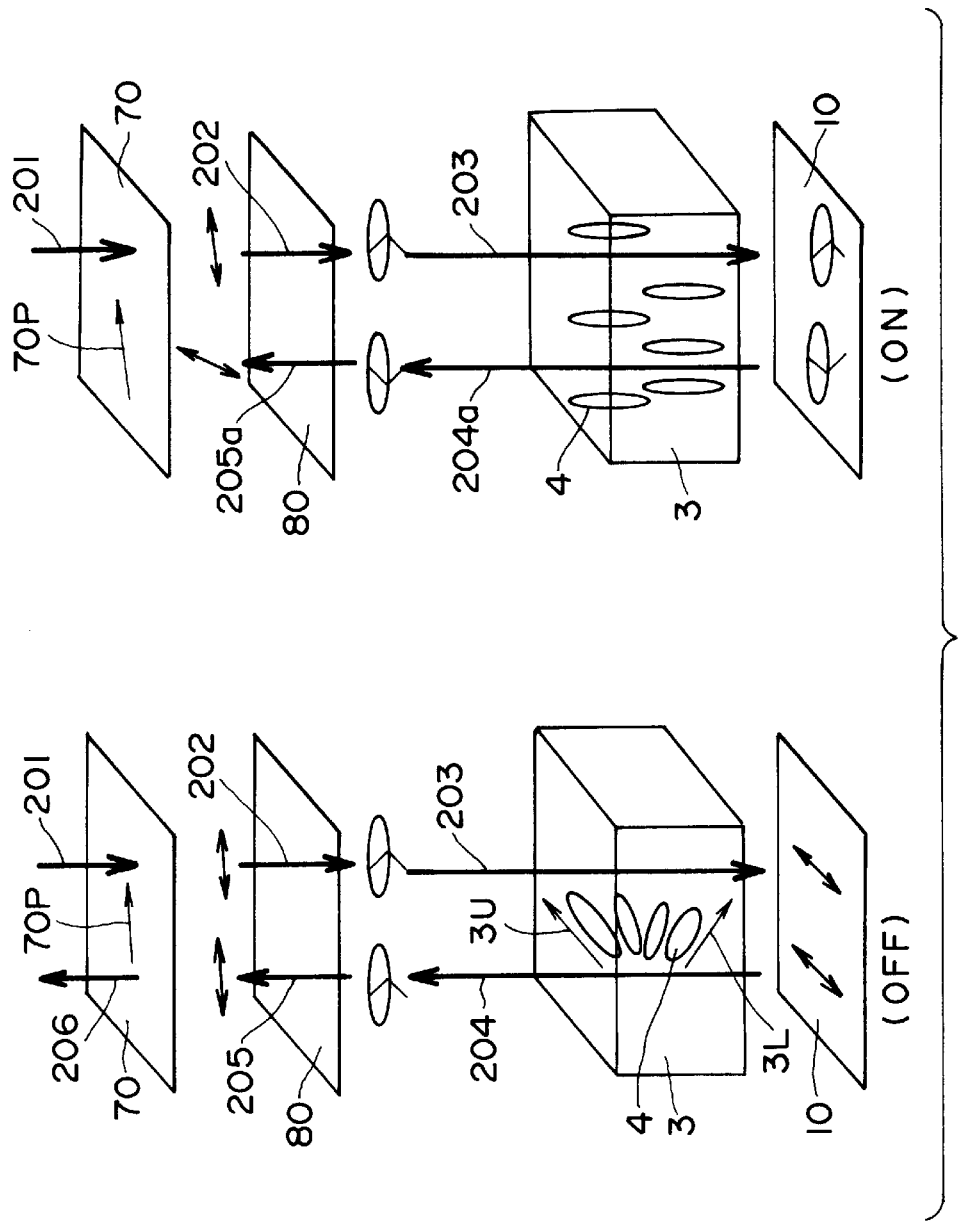
FIG. 1 is a schematic diagram for describing a conceptual structure and operation of a reflection type liquid crystal display device in accordance with the present invention.

Embodiments of the present invention will be described hereinafter in detail with reference to the drawings. FIG. 1 is a schematic diagram for illustrating the structure of a reflection type liquid crystal display device in accordance with the present invention. In the drawing, (OFF) illustrates the arrangement where no voltage is applied and (ON) illustrates the arrangement where a voltage is applied. As shown in (OFF), the reflection type liquid crystal display device has a laminated structure comprising a deflection plate 70 consisting of stretched polymer film having optical anisotropy, a quarter wavelength plate 80, a nematic liquid crystal layer 3, and a diffuse reflection layer 10 consisting of, for example, silver in the order from a viewer side. The transmission axis of the deflection plate 70 is denoted by 70P. The nematic liquid crystal layer 3 is supported between a first substrate disposed on the incident side and a second substrate disposed on the opposite side though they are not shown. The orientation direction 3U of liquid crystal molecules 4 of the first substrate side is prescribed in a range of 168.5±10 degrees with respect to the upward direction of the panel screen. The orientation direction 3L of liquid crystal molecules 4 of the second substrate side is prescribed in a range of 51.5±10 degrees with respect to the upward direction of the screen.

An incident light 201 passes through the deflection plate 70 and converted to a linear polarized light 202. The polarization direction is parallel to the transmission axis 70P, and called as a parallel linear polarized light hereinafter. The parallel linear polarized light 202 passes the quarter wavelength plate and converted to a circular polarized light 203. The circular polarized light 203 passes the nematic liquid crystal layer 3, which functions as a quarter wavelength plate, and converted to a linear polarized light. The polarization direction of the linear polarized light is turned 90 degrees and becomes orthogonal to that of the parallel linear polarized light 202. The turned polarized light is called as parallel linear polarized light hereinafter. The orthogonal linear polarized light 203 is reflected by the diffuse reflection layer 10 and then passes again the nematic liquid layer 3, which functions as a quarter wavelength plate, and converted thereby to a circular polarized light 204. The circular polarized light 204 passes the quarter wavelength plate 80 and converted again to the original parallel linear polarized light 205. The parallel linear polarized light 205 passes the deflection plate 70 and comes out as an out-coming light 206, which is viewed by a viewer and recognized as the white display.

When a voltage is applied as shown in (ON), orientation of liquid crystal molecules 4 consisting of, for example, nematic liquid crystal is converted from twist orientation to approximately perpendicular orientation, and loses the function of a quarter wavelength plate. The external light 201 is converted to a parallel liner polarized light bypassing the deflection plate 70. The parallel linear polarized light 22 passes the quarter wavelength plate 80 and converted to a circular polarized light 203. The circular polarized light 203 passes the nematic liquid crystal layer 3 as it is, and then reflected by the diffuse reflection layer 10, and comes to the quarter wavelength plate 80 as it is a circular polarized light 204a. The quarter wavelength plate 80 converts the circular polarized light 204a to an orthogonal linear polarized light 205a. The orthogonal linear polarized light 205a can not pass the deflection plate 70 and the black display is viewed.

Figure 2:
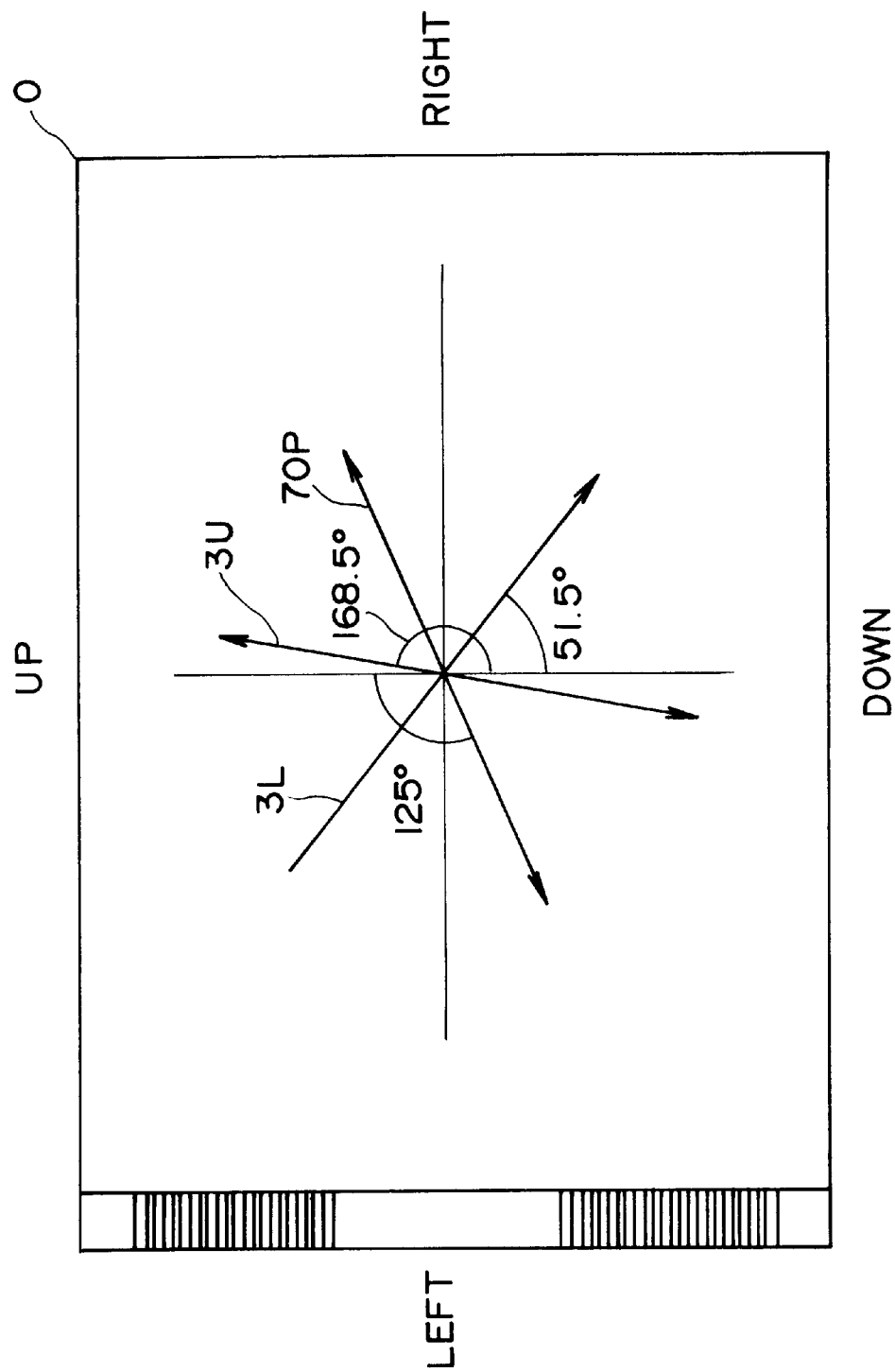
FIG. 2 is a schematic plan view of a reflection type liquid crystal display device in accordance with the present invention.

FIG. 2 is a schematic plan view of the reflection type liquid crystal display device shown in FIG. 1. As shown in FIG. 2, the liquid crystal panel 0 which is a component of the reflection type liquid crystal display device defines a screen where an image is displayed. In FIG. 2, up-and-down and right-and-left directions of the screen are prescribed with reference to a viewer who views the screen. As described herein above, the orientation direction 3U of nematic liquid crystal disposed adjacent to the first substrate on the incident side is prescribed within a range of about 168.5 degrees with respect to the upward direction of the panel 0. The orientation direction 3L of nematic liquid crystal disposed adjacent to the second substrate on the reflection side is proscribed within a range of about 51.5 degrees with respect to the upward direction of the panel 0. The transmission axis 70P of the deflection plate is prescribed within a range of 125±10 degrees with respect to the upward direction of the panel. The quarter wavelength plate is of wide band type comprising a laminated phase difference film having a thickness of about 270 nm and having the drawing axis in the direction of about 72.5 degrees with respect to the transmission axis 70P of the deflection plate and a phase difference film having a thickness of about 140 nm and having the drawing axis in the direction of about 10 degrees with respect to the transmission axis 70P though they are not shown in the drawing. In addition, as for parameters of the liquid crystal panel 0, the twist angle of liquid crystal is about 63 degrees and the retardation is 200 to 250 nm.

Figure 3:
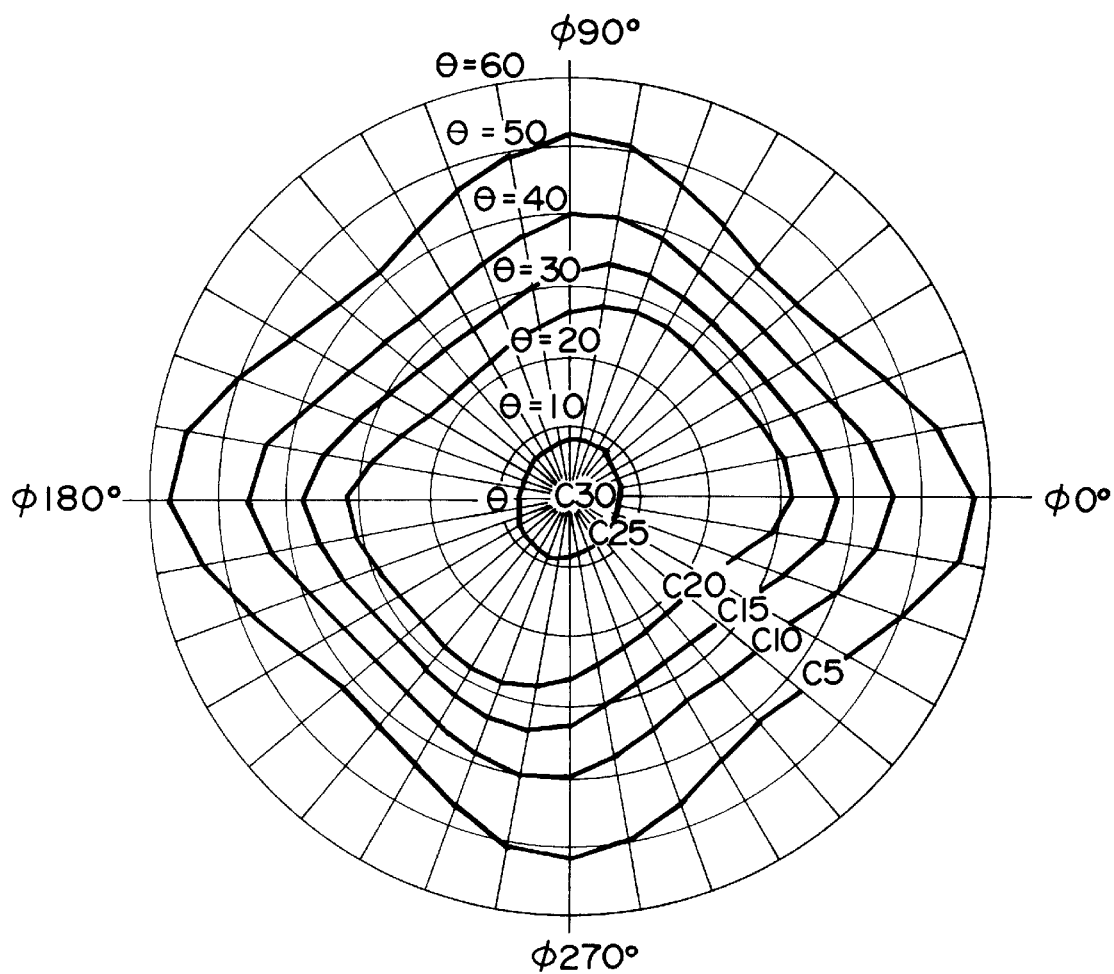
FIG. 3 is a graph for describing the field angle characteristics of a reflection type liquid crystal display device in accordance with the present invention.
Figure 6:
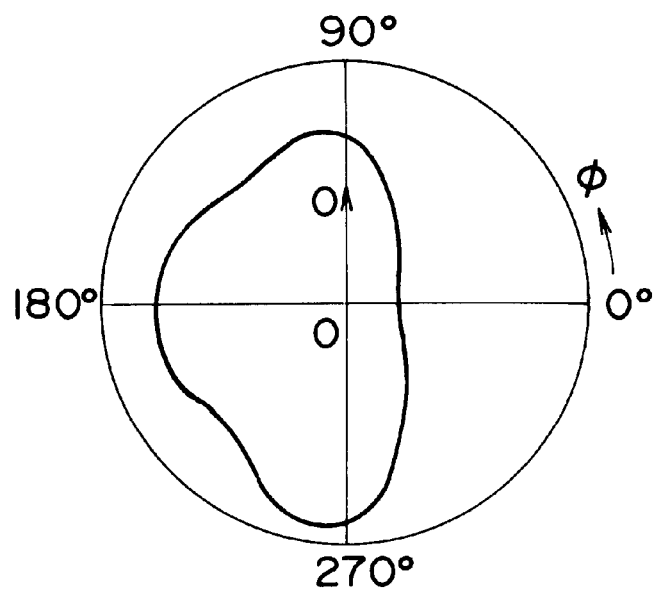
FIG. 6 is a graph for describing the field angle characteristics of a conventional reflection type liquid crystal display device.

FIG. 3 is a graph for describing the field angle characteristics of the reflection type liquid crystal display device shown in FIG. 2, and is an iso-contrast curve similar to the graph shown in FIG. 6. The right direction on the screen of the panel 0 is assigned to the declination φ=0 and the declination φ increases along the circumferential direction in the anti-clockwise direction. In detail, the upward direction of the screen corresponds to φ=90 degrees, the left direction of the screen corresponds to φ=180 degrees, and the downward direction of the screen corresponds to φ=270 degrees. The inclination θ increases in the radial direction through 10 degrees to 60 degrees at 10 degrees increments. The outermost C5 represents the iso-contrast curve of the contrast of 5 among six curves, and the innermost C30 represents the iso-contrast curve of the contrast of 30. As obvious from the graph, the field angle is widest in the directions φ=0 and φ=180 degrees (right and left directions of the screen), and an ideal display for applications such as television is obtained. Further, the field angle is relatively wide in the directions φ=90 and φ=270 (upward and downward direction of the screen). On the other hand, the field angle is narrow in the directions of φ=45, 135, 225, and 315 degrees. To obtain the field angle characteristics which is symmetrical between the right and left directions, a perfectly diffusive light reflection layer which is incorporated in a liquid crystal panel is not used, but a light reflection layer having some directivity is used. In detail, in the reflection type liquid crystal display device in accordance with the present invention, a light reflection layer which reflects the external light diffusively within a limited angular range with respect to the regular reflection direction (for example, ±40 degrees) is formed on the second substrate side. By using the light reflection layer as described herein above, because the incident angle of the reflected light viewed from a predetermined angle is limited to a certain angular range, the symmetry of the field angle characteristics as shown in FIG. 3 is obtained. On the other hand, a perfect diffusive reflection plate results in an asymmetrical field angle characteristics as shown in FIG. 6.

Figure 4:
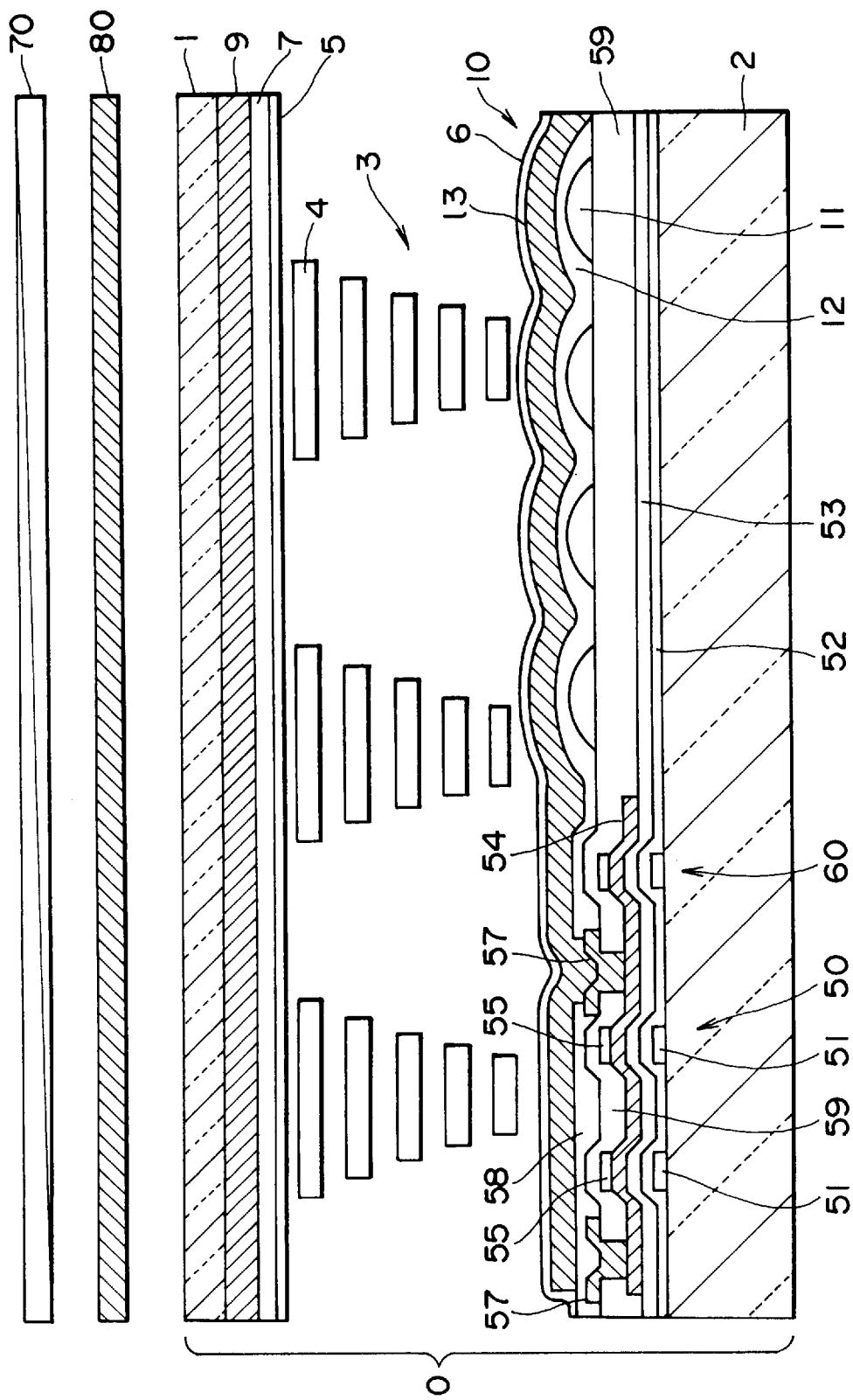
FIG. 4 is a partially cross sectional view for illustrating an example of a reflection type liquid crystal display device in accordance with the present invention.
Figure 5:
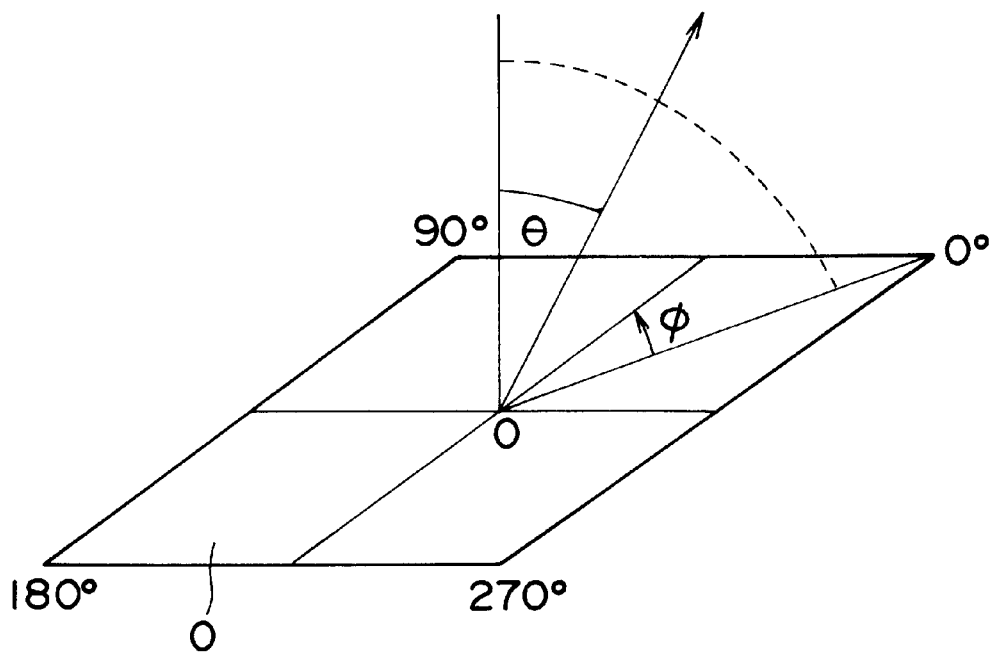
FIG. 5 is a schematic diagram for describing the field angle of a reflection type liquid crystal display device.

Finally, FIG. 4 is a schematic partially cross sectional view for illustrating the embodiment of the reflection type liquid crystal display device in accordance with the present invention. The reflection type liquid crystal display device utilizes a TN-ECB (Twist Nematic-Electrically Controlled Birefringence) mode liquid crystal panel 0. As described in FIG. 4, the reflection type liquid crystal display device is provided with a deflection plate 70 and a quarter wavelength plate 80 on the front side of the panel 0. The panel 0 has a first substrate 1 comprising a transparent glass plate disposed on the incident side where the external light is incident and a second substrate 2 disposed on the opposite side with interposition of a predetermined space, which two substrates are bonded together. A nematic liquid crystal layer 3 is supported in the space between both substrates 1 and 2. Liquid crystal molecules 4 is twist-oriented by upper and lower orientation films 5 and 6. As described herein above, the orientation direction of the nematic liquid crystal molecules 4 adjacent to the first substrate 1 side is prescribed within a range of 168.5±10 degrees with respect to the upward direction of the panel 0, and the orientation of the nematic liquid crystal molecules 4 adjacent to the second substrate 2 side is prescribed within a range of 51.5±10 degrees with respect to the upward direction of the panel 0. Electrodes consisting of, for example, ITO are formed on the inside surface of the respective substrate 1 and 2, a voltage is applied to the nematic liquid crystal layer 3 individually on each pixel. The liquid crystal display of the embodiment is so-called as active matrix type, a counter electrode 7 is formed on the first substrate 1 side, and on the other hand, a pixel electrode (13) is formed on the second substrate 2 side. The pixel electrode is driven by a switching element comprising a thin film transistor 50. The counter electrode 7 and the pixel electrode (13) are facing each other, pixels are defined between both electrodes. A diffusive reflection layer 10 is formed on the inside surface of the second substrate 2 located on the opposite side. The diffusive reflection layer 10 comprises a resin film 11 consisting of, for example, photoresist and a metal film 13 consisting of, for example, silver laminated one on the other. The metal film 13 is served also as the pixel electrode in the present embodiment. A reflection type liquid crystal display devise having the structure as described herein above is of normally white mode TN-ECB type. In detail, the nematic liquid crystal layer 3 remains in twist orientation and functions as a quarter wavelength plate while no voltage is applied and allows the external light to pass to display white in cooperation with the deflection plate 70 and the quarter wavelength plate 80. When a voltage is applied, the nematic liquid crystal layer 3 is converted to perpendicular orientation and loses the function of quarter wavelength plate, and does not allows the external light to pass to display black in cooperation with the deflection plate 70 and the quarter wavelength plate 80.

Next, the respective components are described in detail with reference to FIG. 4. As described herein above, the deflection plate 70 is provided on the surface of the first substrate 1 of the panel 0. The quarter wavelength plate 80 is interposed between the deflection plate 70 and the first substrate 1. The quarter wavelength plate 80 is of wide band type, comprises, for example, two stretched polymer films superposed one on the other, and provides a quarter wavelength phase difference between ordinary light and extraordinary light. A light which passes a quarter wavelength plate again becomes a linear polarized light. In this case, the polarizing direction is turned 90 degrees from the original polarization direction. As described herein above, the polarization direction can be turned by using combined quarter wavelength plate and deflection plate, and this function is utilized for display. From this view point, a diffusive reflection layer 10 having the structure of stable polarization direction is used in the present invention.

The nematic liquid crystal layer 3 consisting of horizontally oriented nematic liquid crystal molecules 4 having positive dielectric anisotropy is basically used for the panel 0. The nematic liquid crystal layer 3 having a thickness which is suitably prescribed functions as a quarter wavelength plate. In the present embodiment, the refractive index anisotropy of the nematic liquid crystal layer 3 Δn is about 0.7, and the thickness of the nematic liquid crystal layer 3 d is 3 μm. Accordingly, the retardation Δn*d of the nematic liquid crystal layer 3 is 0.2 to 0.25 μm. As shown in the drawing, the substantial retardation value of the twist oriented nematic liquid crystal layer 3 is about 0.15 μm (150 nm). This value corresponds to approximately ¼ of the central wavelength (about 600 nm) of the external light, the nematic liquid crystal layer 3 can function optically as a quarter wavelength plate. The nematic liquid crystal layer 3 supported between upper and lower orientation films 5 and 6 results in desired twist orientation. Liquid crystal molecules 4 are arranged along the rubbing direction of the orientation film 5 on the first substrate 1 side, and liquid crystal molecules 4 are arranged along the rubbing direction of the orientation film 6 on the second substrate 2 side. The deviation of rubbing direction of 60 degrees to 70 degrees between the upper and lower orientation films 5 and 6 results in desired twist orientation.

A color filter 9 consisting of, for example, photoresist containing dispersed pigment is formed on the transparent first substrate 1 side. On the other hand, the diffusive reflection layer 10 is formed on the second substrate 2 side located on the opposite side. The diffusive reflection layer 10 having convex/concave surface is light-diffusive. Accordingly, the diffusive reflection layer 10 is paper white in appearance, which is preferable as display background, and gives the wide field angle for easy viewing of display and increased brightness of the display over a wide view range because the incident light is reflected diffusively in a wide angle range. As shown in the drawing, the diffusive reflection layer 10 comprises a resin film 11 having convex/concave surface and a metal film 13 formed on the surface of the resin film 11. As described herein above, the metal film 13 is served also as a pixel electrode. The diffusive reflection layer 10 is formed by a method in which a square-pole- or cylinder-shaped resin film 11 consisting of, for example, photoresist patterned isolatedly to leave the space is reflowed to from a convex/concave surface having a rolling relief. The space remaining after reflowing of the square-pole- or cylinder-shaped resin film 11 is filled with another resin 12 to obtain a convex/concave surface having rolling relief. The convex/concave has an inclination angle of 10 to 20 degrees. Such structure gives a light reflection layer which reflects the external light diffusively within a limited angle range with respect to the regular reflection direction instead of perfect diffusion.

Finally, thin film transistors 50 for driving pixel electrodes are formed in integrated manner on the surface of the second substrate 2. Each thin film transistor 50 has the bottom gate structure, which comprises a gate electrode 51 consisting of, for example, Mo, two gate insulating films consisting of, for example, SiO$_x$ and SiN$_x$ 52 and 53, and a semiconductor thin film 54 consisting of polycrystalline silicon in the order from the bottom. The thin film transistor has the double gate structure having two gate electrodes. A channel area is provided on the area of semiconductor thin film 54 located just above each gate electrode 51. Each channel area is protected by a stopper 55. An auxiliary capacity 60 has the same layer structure as that of the thin film transistor 50. The thin film transistor 50 and auxiliary capacity 60 having such structure are covered with a layer insulator film 59 consisting of, for example, SiO$_2$. A contact hole which communicates to a source area and drain area of the thin film transistor is formed on the layer insulator film 59. A wiring 57 consisting of, for example, Al is formed on the layer insulator film 59, which is connected to the source area and drain area of the thin film transistor 50 through the contact hole. The wiring 57 is covered with another layer insulator film 58. On the layer insulator film 58, the above-mentioned pixel electrode is formed by patterning. The pixel electrode is electrically connected to the drain area of the thin film transistor 50 with interposition of the wiring 57.

As described hereinbefore, according to the present invention, by prescribing the orientation processing direction of nematic liquid crystal to about 168.5 degrees on the incident side substrate and to about 51.5 degrees on the opposite side substrate with respect to the upward direction of the screen, an ideal TN-ECB type normally white mode reflection type liquid crystal display device having a horizontal wide field angle is realized.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention of which render other details difficult to perceive may have been omitted. It should be understood, of course, that the invention is nor necessarily limited to the particular embodiments illustrated herein.

What is claimed is:

1. A reflection type liquid crystal display device comprising:
    a two-sided panel comprising an external light incident side and an opposite side, the external light incident side comprising a transparent first substrate, the opposite side comprising a second substrate on the opposite side, the second substrate being connected to the first substrate with a space disposed therebetween for accommodating a twist-oriented nematic liquid crystal and electrodes for applying a voltage to the nematic liquid crystal;
    a quarter wavelength plate disposed on the first substrate side with the first substrate disposed between the nematic liquid crystal and the quarter wavelength plate;
    a deflection plate disposed on the quarter wavelength plate with the quarter wavelength plate disposed between the first substrate and the deflection plate;
    with no voltage applied to the nematic liquid crystal, the nematic liquid crystal being in a twist orientation and functioning as a quarter wavelength layer thereby allowing external light to pass therethrough and cooperatively through the deflection plate and the quarter wavelength plate resulting in a white display;
    with voltage applied to the nematic liquid crystal, the nematic liquid crystal being in a perpendicular orientation thereby blocking external light from passing therethrough and through the deflection plate and the quarter wavelength plate resulting in a black display;
    the first and second substrates being parallel to one another and the device further comprises an axis passing perpendicularly through the first and second substrates;
    the nematic liquid crystal having an upwardly directed orientation direction passing through the first substrate ranging from about 158.5 to about 178.5 degrees with respect to the axis;
    the nematic liquid crystal having an upwardly directed orientation direction passing through the second substrate ranging from about 41.5 to about 61.5 degrees with respect to the axis.

2. The reflection type liquid crystal display device of claim 1 further comprising a light reflection layer disposed between the first and second substrates for reflecting external light diffusively with respect to the axis.

3. The reflection type liquid crystal display device of claim 2 wherein light reflection layer has a transmission axis direction ranging from about 115 to about 135 degrees with respect to the axis.

4. The reflection type liquid crystal display device of claim 1 further comprising a light reflection layer disposed between the nematic liquid crystal and second substrate for reflecting external light diffusively with respect to the axis.

5. The reflection type liquid crystal display device of claim 4 wherein the light reflection layer has a transmission axis direction ranging from about 115 to about 135 degrees with respect to the axis.

6. The reflection type liquid crystal display device of claim 1 wherein the nematic liquid crystal comprises a layer having a refractive index anisotropy of about 0.7.

7. The reflection type liquid crystal display device of claim 6 wherein the layer has a thickness of about 3 μm.

8. The reflection type liquid crystal display device of claim 7 wherein the layer has a retardation ranging from about 0.2 to about 0.25 μm.

9. The reflection type liquid crystal display device of claim 8 wherein the layer has a substantial retardation value when a voltage is applied of about 0.15 μm.

10. The reflection type liquid crystal display device of claim 1 wherein the nematic liquid crystal comprises a layer that is disposed between upper and lower orientation films, the upper orientation film being disposed between the first substrate and the layer, the lower orientation film being disposed between the second substrate and the layer.

11. The reflection type liquid crystal display device of claim 1 further comprising a light reflection layer disposed between the nematic liquid crystal and the second substrate for reflecting external light diffusively with respect to the axis, the light reflection layer comprising a resin film and a metal film, the metal film being disposed between the resin film and the nematic liquid crystal, the resin film being disposed between the metal film and the second substrate.

12. The reflection type liquid crystal display device of claim 11 wherein light reflection layer has a transmission axis direction ranging from about 115 to about 135 degrees with respect to the axis.

13. A reflection type liquid crystal display device comprising:

a two-sided panel comprising an external light incident side and an opposite side, the external light incident side comprising a transparent first substrate, the opposite side comprising a second substrate on the opposite side, the second substrate being disposed parallel to the first substrate with a space disposed therebetween for accommodating a twist-oriented nematic liquid crystal and electrodes for applying a voltage to the nematic liquid crystal;

a quarter wavelength plate disposed on the first substrate side with the first substrate disposed between the nematic liquid crystal and the quarter wavelength plate;

a deflection plate disposed on the quarter wavelength plate with the quarter wavelength plate disposed between the first substrate and the deflection plate;

with no voltage applied to the nematic liquid crystal, the nematic liquid crystal being in a twist orientation and functioning as a quarter wavelength layer thereby allowing external light to pass therethrough and cooperatively through the deflection plate and the quarter wavelength plate resulting in a white display;

with voltage applied to the nematic liquid crystal, the nematic liquid crystal being in a perpendicular orientation thereby blocking external light from passing therethrough and through the deflection plate and the quarter wavelength plate resulting in a black display;

the first and second substrates being parallel Lo one another and the device further comprises an axis passing perpendicularly through the first and second substrates;

the nematic liquid crystal having an upwardly directed orientation direction passing through the first substrate ranging from about 158.5 to about 178.5 degrees with respect to the axis;

the nematic liquid crystal having an upwardly directed orientation direction passing through the second substrate ranging from about 41.5 to about 61.5 degrees with respect to the axis; and a light reflection layer disposed between the first and second substrates for reflecting external light diffusively with respect to the axis.

14. The reflection type liquid crystal display device of claim 13 wherein light reflection layer has a transmission axis direction ranging from about 115 to about 135 degrees with respect to the axis.

15. The reflection type liquid crystal display device of claim 13 wherein the nematic liquid crystal comprises a layer having a refractive index anisotropy of about 0.7.

16. The reflection type liquid crystal display device of claim 15 wherein the layer has a thickness of about 3 μm.

17. The reflection type liquid crystal display device of claim 16 wherein the layer has a retardation ranging from about 0.2 to about 0.25 μm.

18. The reflection type liquid crystal display device of claim 17 wherein the layer has a substantial retardation value when a voltage is applied of about 0.15 μm.

19. The reflection type liquid crystal display device of claim 13 wherein the nematic liquid crystal comprises a layer that is disposed between upper and lower orientation films, the upper orientation film being disposed between the first substrate and the layer, the lower orientation film being disposed between the second substrate and the layer.

20. A reflection type liquid crystal display device comprising:

a two-sided panel comprising an external light incident side and an opposite side, the external light incident side comprising a transparent first substrate, the opposite side comprising a second substrate on the opposite side, the second substrate being disposed parallel to the first substrate with a space disposed therebetween for accommodating a twist-oriented nematic liquid crystal and electrodes for applying a voltage to the nematic liquid crystal;

a quarter wavelength plate disposed on the first substrate side with the first substrate disposed between the nematic liquid crystal and the quarter wavelength plate;

a deflection plate disposed on the quarter wavelength plate with the quarter wavelength plate disposed between the first substrate and the deflection plate;

with no voltage applied to the nematic liquid crystal, the nematic liquid crystal being in a twist orientation and functioning as a quarter wavelength layer thereby allowing external light to pass therethrough and cooperatively through the deflection plate and the quarter wavelength plate resulting in a white display;

with voltage applied to the nematic liquid crystal, the nematic liquid crystal being in a perpendicular orientation thereby blocking external light from passing therethrough and through the deflection plate and the quarter wavelength plate resulting in a black display;

the first and second substrates being parallel to one another and the device further comprises an axis passing perpendicularly through the first and second substrates;

the nematic liquid crystal having an upwardly directed orientation direction passing through the first substrate ranging from about 158.5 to about 178.5 degrees with respect to the axis;

the nematic liquid crystal having an upwardly directed orientation direction passing through the second substrate ranging from about 41.5 to about 61.5 degrees with respect to the axis; and a light reflection layer disposed between the nematic liquid crystal and the second substrate for reflecting external light diffusively with respect to the axis, the light reflection layer comprising a resin film and a metal film, the metal film being disposed between the resin film and the nematic liquid crystal, the resin film being disposed between the metal film and the second substrate, the light reflection layer having a transmission axis direction ranging from about 115 to about 135 degrees with respect to the axis; and the nematic liquid crystal comprises a layer that is disposed between upper and lower orientation films, the upper orientation film being disposed between the first substrate and the layer, the lower orientation film being disposed between the second substrate and the layer.

* * * * *